United States Patent [19]

Junge et al.

[11] Patent Number: 4,809,487
[45] Date of Patent: Mar. 7, 1989

[54] HEIGHT CONTROL SYSTEM WITH MULTIPLE CONTROL VALVES

[75] Inventors: Steve A. Junge, Johnston; Leon F. Sanderson, Des Moines, both of Iowa

[73] Assignee: Deere & Company, Moline, Ill.

[21] Appl. No.: 101,873

[22] Filed: Sep. 28, 1987

[51] Int. Cl.$^4$ ............................................. A01D 46/08
[52] U.S. Cl. .......................................... 56/10.2; 56/28
[58] Field of Search ................ 56/10.2, DIG. 15, 208, 56/28

[56] References Cited

U.S. PATENT DOCUMENTS

| | | | |
|---|---|---|---|
| 3,196,599 | 7/1965 | Meiners | 56/208 |
| 3,417,553 | 12/1968 | Hubbard | 56/208 |
| 4,229,931 | 10/1980 | Schlueter et al. | 56/10.2 |
| 4,327,540 | 5/1982 | Swanson et al. | 56/10.2 |
| 4,335,561 | 6/1982 | Swanson et al. | 56/10.2 |

Primary Examiner—John Weiss

[57] ABSTRACT

Height sensing structure utilizing a pair of height sensing valves connected to height sensing shoes on two row harvesting units. The row harvesting units are transversely adjustable on support structure to accommodate different row spacings and to open up space between the units for service and inspection. The height control valves are connected by flexible conduit and a shuttle check valve to a lift cylinder, and interconnecting linkages between the height sensing shoes on adjacent units are eliminated so that the units may be freely adjusted. The shuttle valve assures that the height control valve sensing the highest ground condition controls the lift cylinder to prevent "digging in".

15 Claims, 2 Drawing Sheets

HEIGHT CONTROL SYSTEM WITH MULTIPLE CONTROL VALVES

BACKGROUND OF THE INVENTION

The present invention relates generally to agricultural implements, and more specifically to height control structure for automatically controlling the location of a portion of the implement relative to the ground.

On agricultural equipment, such as a cotton picker, more than one harvesting unit or the like is raised and lowered by a single lift structure, and height sensing is typically accomplished with a single valve attached to one of the units. A mechanical linkage, extending transversely between units, links a height-sensing shoe from each unit to the single valve. The valve, in turn, is connected to a hydraulic cylinder which raises and lowers the unit support structure in response to movement of the shoes. The linkages are generally bulky and joints tend to wear and cause lost motion which affects the operation and adjustment of the height control system. The connections between unit hinder lateral movement of the units for row spacing adjustment and for access to the row units for service. If a single height-sensing shoe is utilized to eliminate the linkage between units, the units which are offset from the height-sensed unit are susceptible to "digging in" in rough or irregular terrain.

In co-pending application, Ser. No. 087,073, filed Aug. 19, 1987 of Steve Allan Junge and Timothy Arthur Deutsch and commonly assigned with the present application, picking unit support structure is disclosed which provides easy lateral adjustment of row units on a support frame for quickly changing row spacings or for opening up areas between units for inspection and servicing. Mechanical linkages between height-sensing shoes on different units can reduce the flexibility, adjustability and serviceability of such a structure. However, it is necessary to provide more than one height sensing member in order to eliminate problems of digging in at one of the structure, particularly when up to three harvesting units may be supported on a single frame.

BRIEF DESCRIPTION OF THE INVENTION

It is therefore an object of the present invention to provide improved height sensing structure for an agricultural implement. It is a further object to provide such structure which has fewer and shorter mechanical linkages than at least most previously available height sensing structures.

It is yet another object of the present invention to provide an improved height sensing structure having at least two height sensing members spaced from each other on different units on the implement. It is still another object to provide such structure which provides improved flexibility, and facilitates lateral adjustments of the units for such things as servicing of the units and accommodating different row spacings. It is another object to provide such a structure which eliminates mechanical linkages extending between the height sensing members.

It is yet another object of the invention to provide an improved height sensing structure including at least two height sensing members spaced on an implement and connected by a hydraulic circuit which eliminates mechanical linkages and provides reliable height sensing to avoid digging in.

In accordance with the above objects, height sensing structure is provided having two height control valves mounted closely to two height sensing shoes on transversely spaced and adjustable harvesting units. Each valve is actuated by the corresponding height sensing shoe. The shoes are not mechanically linked together so that long cumbersome linkages which would otherwise limit flexibility and increase sensitivity and adjustment problems are eliminated. A shuttle check valve is connected to the outputs of the two valves and prevents one valve from overriding the other and causing a unit to operate too low to the ground. The shuttle valve causes the unit sensing the highest ground to control the height of all the units and prevent digging in. Flexible hoses are utilized to connect to the valves so that the units may be easily adjusted with respect to each other and so that access and service areas are not blocked by any of the height sensing structure.

These and other objects, features and advantages of the present invention will become apparent to those skilled in the art from the description which follows and from the drawings.

DESCRIPTION OF THE PREFERRED EMBODIMENT

Figure 1:
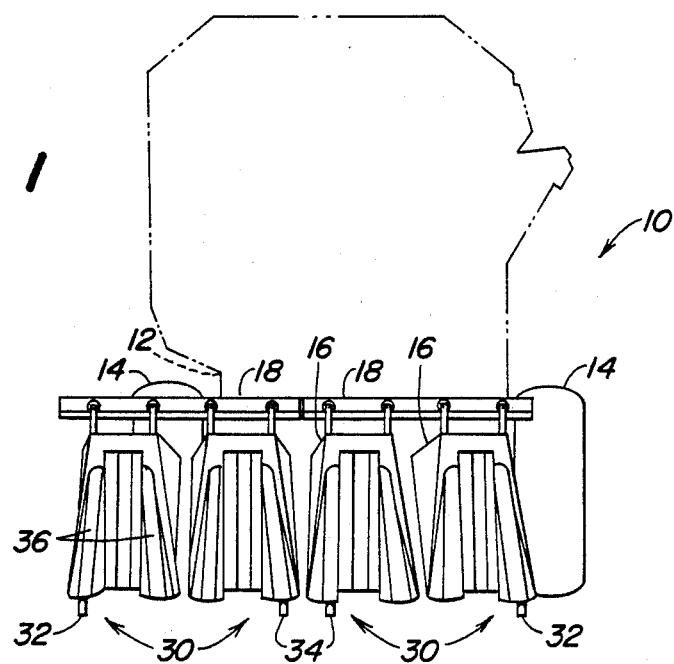
FIG. 1 is a front view of a cotton picker with the height sensing structure of the present invention attached thereto.
Figure 2:
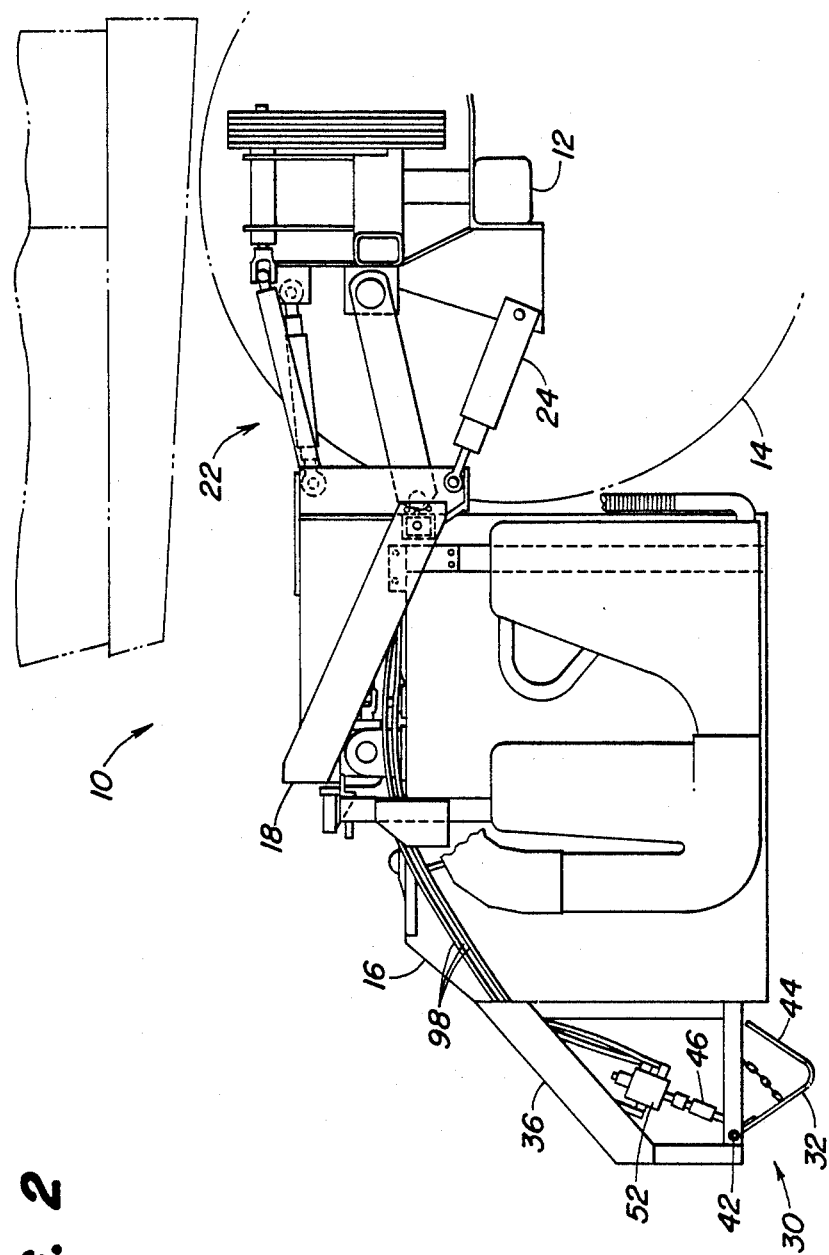
FIG. 2 is a side view of the front portion of the picker of FIG. 1 and showing a valve and height sensing shoe on one of the units.

Referring to FIG. 1, there is shown a cotton harvester 10 having a main frame 12 supported for forward movement over the ground by ground wheels 14. A plurality of transversely spaced row units 16 are carried on vertically adjustable support structures 18 which extend in the transverse direction ahead of the respective wheels 14. As shown, the row units and support structures are of the type shown and described in the aformentioned Junge and Deutsch application, and the units are easily rolled laterally to adjust for differing row widths and to open up the area between the units for service and inspection. Each support structure 18 is connected by lift structure 22 (FIG. 2) to the harvester frame 12, and a hydraulic cylinder 24 connected between the frame 12 and the support structure 18 is operable to raise and lower the support structure 18 to maintain the row units 16 at the proper height for harvesting crop from the rows of plants. Height sensing structure 30 is connected to the row units 16 and to the lift cylinder 24 to automatically maintain the support structure 18 at the proper height above the ground. The height sensing structure 30 includes two height sensing shoes or skids 32 and 34 transversely offset from each other on the support structure 18. Preferably, the shoes 32 and 34 are supported in a conventional manner from a lower portion of stock lifters 36 connected to the forward portion of the row unit 16. The shoes 32 and 34 are substantially identical and so only the shoe 32 will be described in detail. The shoe 32 is pivotally connected at 42 and extends downwardly and rearwardly therefrom to an upwardly directed rear portion 44. An adjustable length link 46 is connected rearwardly adjacent the pivotal connection 42 for movement with the shoe 32 with variations in the distance between the row unit and the surface of the ground.

A height sensing valve 52 is supported by the stock lifter 36 closely adjacent the shoe 32 and includes a spool operably connected to the shoe by the adjustable length link 46. The valve 52 is a three position three port valve having inputs 56 and 58 (FIG. 3) and an output 62. The valve 52 has a "lower" position wherein the input port 56 is blocked and the input port 58 is in communication with the output port 62. The spool is movable to a second or "neutral" position wherein the ports 56, 58 and 62 are blocked. The spool is movable upwardly from the neutral position to a "raise" position wherein the port 56 is in communication with the output port 62 and the port 58 is blocked. An identical height sensing valve 54 is operably connected to the shoe 34.

The input ports 56 for the valves 52 and 54 are connected together and to a source or pressure through a one-way check valve 68. The input ports 58 are also connected together and are connected to a three position operator control valve 72 through a pilot operated check valve 74.

A shuttle valve 82 includes input ports 84 and 86 connected to the output ports 62 of the respective valves 52 and 54. The shuttle valve 82 also includes an output port 88 connected to the base end of the cylinder 24. Pressurized hydraulic fluid at the input ports 84 and 86 will act on opposite sides of a floating ball 92 to automatically connect the output port 88 with the input port having the highest pressure. The input port 86 of the shuttle valve 82 is also connected through a one-way check valve 94 to the check valve 74 at the output of the operator control valve 72.

The hydraulic circuit includes flexible hoses indicated generally at 98 connecting the valves 52, 54 and 82 to permit the row units 16 to be adjusted freely with respect to each other without hindrance from the height sensing structure. The conduits connecting the various valves are routed along the row units to provide unhindered access to the units for servicing and inspection.

Figure 3:
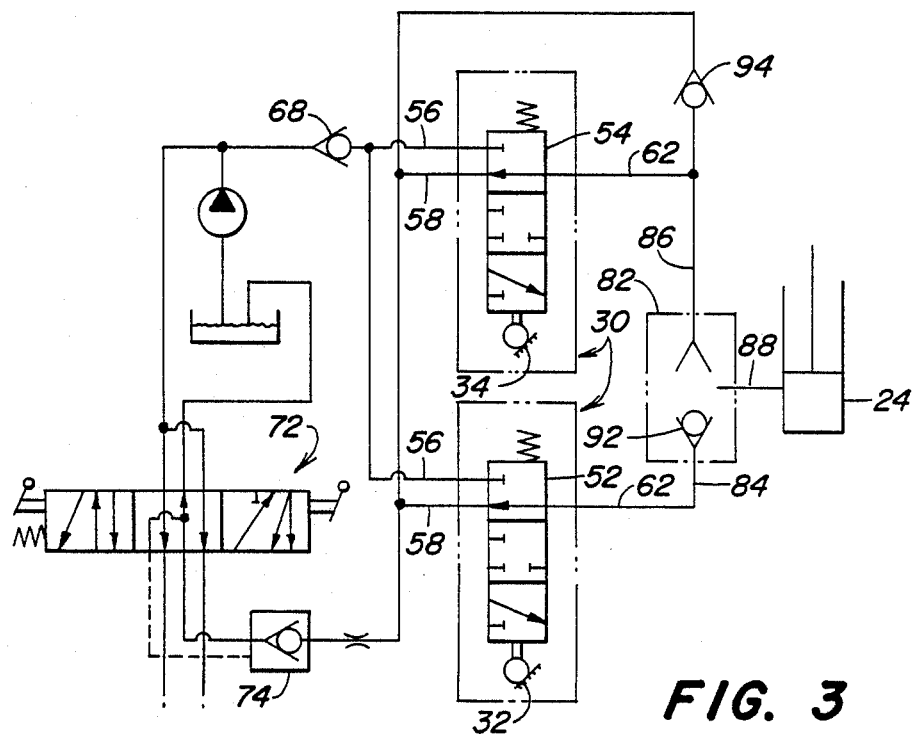
FIG. 3 is a schematic representation of the hydraulic circuit of the height sensing structure.

In operation, assuming that the lift cylinder 24 is fully extended so that the support structure 18 with the row units 16 is lifted above the ground in a transport position, the height sensing shoes 32 and 34 will be pivoted downwardly so that the spools of the valves 52 and 54 will be in their "lower" positions as shown in FIG. 3. To move the row units 16 downwardly to a position within the range of the height sensing structure 30, the operator moves the control valve 72 from the neutral position (as shown in FIG. 3) to the right to open the check valve 74 and thereby open the input ports 58 to reservoir. Fluid will be forced out of the base end of the lift cylinder 24 through the shuttle valve 82, the valves 52 and 54 and the check valve 74 to reservoir. The row units 16 will move downwardly with the support structure 18 until, assuming level ground conditions, both of the valves 52 and 54 are moved to their "neutral" positions wherein the ports 56, 58 and 62 are closed and fluid is prevented from moving out from the cylinder 24. If a one of the units 16 moves downwardly below a preselected height above the ground, the corresponding valve will be moved to the "raise" position wherein the high pressure input port 56 is in open communication with the output port 62 of the same valve, and fluid under pressure will be communicated from the output port 62 through the shuttle valve 82 to the lift cylinder 24 to raise the support structure 18 and lift the row units 16 until both height sensing valves are moved away from the "raise" position. The shuttle valve 82 communicates the highest pressure at the input ports 84 and 86 to the lift cylinder 24 to assure that the row unit 16 sensing the highest ground level controls the heights of all the row units 16 on the support structure 18 to prevent digging in.

To raise the support structure 18 and corresponding row units 16 from the height control range to a raised transport condition, the operator moves the control valve 72 to the far left (FIG. 3) to open the check valve 74 and pressurize the input line connected to the input ports 56 and 58. The check valve 94 permits fluid under pressure to flow freely around the valves 52 and 54 through the shuttle valve 82 into the base of the cylinder 24 to extend the cylinder and raise the units to the transport position. The operator may also maintain the support structure 18 in a preselected minimum height position by moving the operator control valve 72 to the position shown in FIG. 3 once the support structure 18 is at the desired height. When the valve is in the central or neutral position, the check valve 74 is closed preventing flow of hydraulic fluid from the base end of the cylinder 24 regardless of the positions of the spools in the height sensing valves 52 and 54. However, if either of the height sensed row units 16 begins to operate too low to the ground, the corresponding height sensing valve will move to the "raise" position and fluid under pressure will be communicated through the check valve 68 and the height sensing valve through the shuttle valve 82 to the cylinder 24 to cause the cylinder to extend and move the row units upwardly until the spool of the height sensing valve moves to the neutral position.

Having described the preferred embodiment, it will be apparent that modifications can be made without departing from the scope of the invention as defined in the accompanying claims.

We claim:

1. In an implement having a vertically adjustable unit support structure adapted for movement forwardly over the ground, and hydraulic cylinder means for moving the unit support structure vertically with respect to the ground, a height control assembly comprising:

at least first and second height sensing members offset from each other for providing indications of the height of the unit support structure above the ground at two locations;

first and second height control valves operatively connected to the first and second height sensing members, respectively, each valve connected to a source of hydraulic fluid under pressure and movable between a "raise" and a "lower" position by the respective height sensing members as the locations approach preselected lower and upper height limits, respectively; and hydraulic control means connected between the height control valves and the hydraulic cylinder means for connecting the source to the cylinder means to lift the unit support structure when either valve is in the "raise" position regardless of the position of the other valve, said hydraulic control means including a pressure responsive valve having first and second inputs connected to the first and second height control valves, respectively, and an output connected to the cylinder means.

2. The invention as set forth in claim 1 wherein the unit support structure includes at least first and second units, means for supporting the first and second height control valves on the respective first and second units for adjustment therewith, and flexible conduit means for connecting the first and second height control valves to the hydraulic control means to thereby facilitate adjustment of the units relative to each other.

3. The invention as set forth in claim 2 wherein the first and second height sensing members comprise first and second ground engaging shoes located closely adjacent the first and second height control valves, respectively.

4. The invention as set forth in claim 1, wherein the pressure responsive valve comprises a shuttle valve.

5. The invention as set forth in claim 4 including means for raising the unit support structure independently of the height control valves, said means for raising comprising an operator control valve connected to the source of hydraulic fluid and check valve means connected between the operator control valve and the shuttle valve.

6. In an implement having a main frame adapted for forward movement over the ground, a vertically adjustable unit support structure attached to the main frame, and hydraulic cylinder means moving the unit support structure vertically with respect to the ground, in combination:
   first and second harvesting units connected to the unit support structure for vertical movement together therewith, means for moving the harvesting units transversely on the support structure for accommodating various row widths and to open up space between the units for maintenance and inspection; and
   height sensing structure comprising first and second height sensing members, means for supporting the first and second height sensing members from the first and second harvesting units, respectively, for providing an indication of the height of the corresponding unit above the ground, first and second height control valves operably connected to the first and second height sensing members, respectively, each valve connected to a source of hydraulic fluid under pressure and movable between "raise" and "lower" positions by the corresponding height sensing member as the given unit approaches a preselected lower and a preselected upper height limit, respectively, and valve means connected between the height control valves and the hydraulic cylinder means for operating the cylinder to lift the unit support structure when either valve is in the "raise" position regardless of the position of the other valve.

7. The invention as set forth in claim 6 including flexible conduit means connecting the height control valves and the valve means to thereby facilitate transverse adjustments of the harvesting units relative to each other.

8. The invention as set forth in claim 7 wherein the first and second height sensing members comprise first and second ground engaging shoes located closely adjacent the first and second height control valves, respectively.

9. The invention as set forth in claim 6 wherein the valve means comprises a shuttle valve.

10. The invention as set forth in claim 6 wherein the height control valves include first and second input ports and an output port, wherein the valve means comprises a shuttle check valve having two input ports connected to the output ports of the height sensing valves and a shuttle valve output port connected to the hydraulic cylinder means.

11. In an implement having a main frame adapted for forward movement over the ground, a vertically adjustable unit support structure attached to the main frame, and hdyraulic cylinder means for moving the unit support structure vertically with respect to the ground, height control structure comprising:
   first and second transversely spaced ground engaging shoes connected for movement vertically with the support structure and providing indications of the height of the support structure above the ground, and means for adjusting the ground engaging shoes transversely with respect to each other;
   first and second height control valves connected to a source of fluid under pressure, the first and second valves including spool means operably connected to the respective first and second shoes and movable between raise, lower and neutral positions in response to the height indications; and
   pressure responsive valve means connected to the first and second valves and to the hydraulic cylinder means for operating the cylinder to raise the support structure when either of the spool means is in the raise position regardless of the position of the other spool means.

12. The invention as set forth in claim 11 wherein the pressure responsive valve means comprises a shuttle valve.

13. The invention as set forth in claim 12 wherein the first and second height control valves are connected in parallel between the source and the shuttle valve.

14. The invention as set forth in claim 13 including bypass means connected between the source and the shuttle valve for selectively raising the unit support structure independently of the height control valves.

15. The invention set forth in claim 14 further comprising an operator control valve and a check valve connected between the source and the height control valves, said operator control valve having a first position for causing the cylinder to lower the support structure toward a lowermost position when the spool means is in the lower position, a second position for preventing lowering of the support structure below a selectable position above the lowermost position, and a third position for the raising of the unit support structure independently of the height control valves.

* * * * *